3,309,213
PIGMENTING WITH CERTAIN DIOXAZINES
André Pugin, Riehen, near Basel, and Kurt Burdeska, Basel, Switzerland, assignors to J.R. Geigy A.-G., Basel, Switzerland
No Drawing. Filed June 25, 1963, Ser. No. 290,342
Claims priority, application Switzerland, July 3, 1962, 8,003/62
17 Claims. (Cl. 106—193)

The present invention concerns a novel process for the production of coloured stable high-molecular organic compounds, lacquers and printing inks having bordeaux to maroon shades, and to the aforesaid coloured materials themselves as well as finished goods produced therefrom.

It has been found that the aforesaid novel bordeaux to maroon coloured materials are obtained with dioxazines of the formula

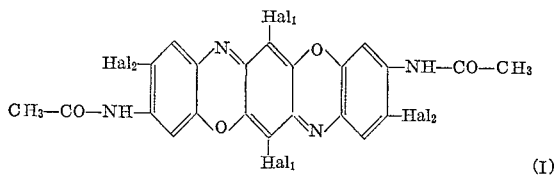

(I)

wherein one of the substituent pairs $Hal_1$ and $Hal_2$ is a pair of chlorine atoms and the other is either a pair of chlorine or a pair of bromine atoms, i.e. with one of the following three compounds: 2,6-diacetylamino-3,7,9,10-tetrachloro-triphenodioxazine, 2,6-diacetylamino-3,7-dichloro-9,10-dibromo-triphenodioxazine, and 2,6-diacetylamino-3,7-dibromo-9,10-dichloro-triphenodioxazine, which are incorporated as pigments into corresponding starting materials of different shades.

The aforesaid three dioxazines of Formula I are known as intermediates in the production of dioxazine pigments which have been obtained from the compounds of Formula I by a re-acylation whereby the —CO—CH$_3$ groups of the dioxazines of Formula I are replaced by unsubstituted or substituent benzoyl radicals. However, the fastness to migration of such benzoyl-substituted dioxazines is often unsatisfactory. Moreover, they do not yield maroon to bordeaux shades.

Generally, the fastness to migration of pigmented materials improves with increased molecular weight of the pigments.

However, we have found that, unexpectedly, the three dioxazines of Formula I which are characterised apart from the two pairs of halogen substituents, $Hal_1$ and $Hal_2$, only by an acetyl group instead of the benzoyl group of the known pigments, at each terminal benzene ring of their molecules yield materials of maroon to bordeaux shade which possess excellent fastness to migration when used as pigments in the manner described above. This is also particularly unexpected because the heavier homolog compounds having two propionyl instead of the two acetyl groups of the said compunds are of similarly unsatisfactory fastness to migration as the corresponding known benzoyl-substituted dioxazines.

Hitherto, no pigments of the dioxazine series have been known which impart to the materials pigmented therewith the aforementioned maroon to bordeaux shades and at the same time fully satisfy the demands as to fastness, particularly to migration and light, required for a commercially useful pigmented material.

This gap is now filled by using the compounds of Formula I according to the process of the invention.

For use as pigments the compounds of Formula I are advantageously brought into a finely dispersed form. This is done by grinding them, advantageously in the presence of grinding assistants such as inorganic or organic salts which can be later removed with solvents and, optionally, additional grinding adjuvants such as organic solvents, acids or bases. In some cases, the pigments can also be perfected by grinding with organic solvents alone, without the addition of salts. After grinding, the assistants are removed, for example inorganic salts are dissolved with water and organic adjuvants are removed, preferably by distillation or with steam.

In this way, finely dispersed, bordeaux to maroon coloured pigments of remarkable colour strength and purity are obtained which, compared with the crude products have a softer texture and increased colour strength. They can be used for pigmenting, among other materials, of varnishes, rubber, lacquers, e.g. stoving lacquer, synthetic organic plastics and other materials, all of which are enumerated in greater detail below. In lacquers with full strength, very desirable maroon shadings are obtained. The pigments are also very suitable for the production of printing inks, for paper printing as well as for the colouring of viscose, cellulose, polyamide and polyester materials in the mass. The prints obtained therewith are distinguished by great colour strength, very good fastness to light even in the case of weak coloration as well as by good fastness to solvents, cross lacquering, rubbing, washing, migration and heat.

Materials which lend themselves particularly well to pigmenting according to the invention with a compound of the Formula I, are (a) Plastic macromolecular materials, namely, polyvinylchloride, polyvinylacetate, polyacrylonitrile polymers of lower alkyl esters of acrylic and methacrylic acid, polyethylene, polypropylene, polystyrene, rubber and chlorinated rubber, synthetic polyamide, in particular hexamethylene-diamine adipate (nylon), polyester (ethyleneglycolterephthalate), acetylcellulose and viscose fibers, fabrics and the like goods;

(b) Film-forming materials, namely, nitrocellulose, shellac, phenol formaldehyde lacquer resin, melamine formaldehyde lacquer resin, urea formaldehyde lacquer resin, alkyd resins (Kunststoff Lexikon, Carl Hansen Verlag, Munich, Germany, 1961, pages 21–23) in particular unmodified alkyd resin, alkyd resin modified with monostyrene, alkyd resin modified with a fatty acid, with a resinic acid or with a mixture of a resinic and a fatty acid, alkyd resin modified with urea formaldehyde lacquer resin, oil-modified alkyd resin, polyvinylchloride, polyvinylacetate, polyvinylacetal, such as polyvinylbutyral, unsaturated liquid polyester resin alone, or modified with monostyrene (ibidem, pages 252–253), saturated liquid polyester resin, esterified epoxide resins (ibidem pages 109–110), unesterified epoxide resins (ibidem pages 109–110); oil reactive alkylphenol resin (ibidem pages 23–24 and 224), mixtures of the two latter resins, drying oil capable of forming varnishes, and ketonic resins (ibidem, page 171).

Not only the homogeneous compounds listed above, but also mixtures of several of the above-listed plastics as well as mixed condensates and mixed polymers such as, e.g. those of the aforesaid homopolymers with other ethylenically unsaturated monomers capable of copolymerization therewith, in particular butadiene, are suitable as substrate materials in the process according to the invention.

A particularly valuable group of starting materials are the so-called thermoplastics, i.e. the non-curable plastics. Of these, in particular the vinyl polymers are preferred.

The compounds of Formula I above are incorporated into the substrates, especially the plastics, for example, by admixing one of the compounds therewith, for instance in a master batch, using rollers, mixing or grinding apparatus. The pigmented material is then brought to the final form desired by known methods such as calendering, moulding, extrusion, coating, casting or by injection moulding. In order to produce articles which are not brittle or to reduce the brittleness of the end product, it is often necessary to incorporate so-called plasticisers into the substrate materials before processing. Esters of phosphoric acid, phthalic acid or sebacic acid can be used for this purpose. The plasticisers can be incorporated either during the process according to the invention or after the pigment has been incorporated into the starting materials. In addition, variations of shades are obtained by adding to the starting materials, fillers or other colouring components such as white, multi-coloured or black pigments together with the compounds of the Formula I, in any desired proportion.

Because of their excellent fastness properties, many of the bordeaux to maroon pigmented materials produced according to the invention are particularly well suited as raw materials for lacquers. In particular, the alkyd resins, nitrocellulose, urea- and melamine-formaldehyde resins, polyvinyl and epoxide resins and unsaturated polyester resins, pigmented according to the invention are very useful for this purpose. To produce pigmented lacquers and printing inks according to the invention, the corresponding starting materials and the compound of Formula I alone or together with additives such as fillers, other pigments, siccatives or plasticisers, are finely dispersed or dissolved in an organic solvent or mixture of solvents. Either the individual components can be dissolved or dispersed alone or several can be dissolved or dispersed together and then the remaining component or components added.

Pigmented high-molecular compounds according to the invention contain in general amounts of 0.001 to 30% in the case of plastic masses preferably 0.1 to 5%, and 20–30% in the case of printing inks, of a compound of Formula I, all percentages being by weight, calculated on the starting compound to be pigmented. The choice of the amount of pigment depends principally on the colour strength desired, further on the thickness of the articles and finally, on the content of white pigment where the latter is present in the high molecular compound.

The aforesaid three dioxazines of Formula I are produced by condensing a dianil of the formula

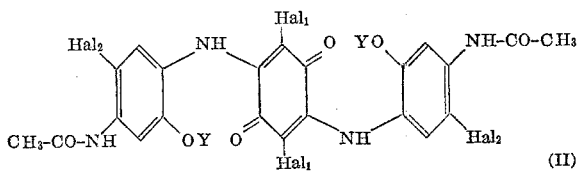

wherein $Hal_1$ and $Hal_2$ have the above given meanings, and Y represents an aliphatic, cycloaliphatic, araliphatic or aromatic radical, by heating to form the corresponding compound of Formula I.

Y in Formula II is either an aliphatic, cycloaliphatic or araliphatic radical and preferably the methyl, ethyl, propyl, isopropyl, cyclohexyl or benzyl radical; or Y is an aromatic radical for example one of the benzene or naphthalene series. Starting compounds of Formula II in which Y is a phenyl radical which may be substituted such as the o- or p-methylphenyl or the o- or p-chlorophenyl or p-methoxyphenyl radical, are preferred as they react at relatively low temperatures to form the dioxazines of Formula I, whereby chemically purer pigments are obtained.

The dianils of Formula II are heated to form the dioxazines of Formula I advantageously in an inert organic solvent alone or in the presence of acid condensing agents.

Suitable solvents are, for example, high boiling petroleum fractions or unhalogenated or halogenated and/or nitrated hydrocarbons of the benzene or naphthalene series, e.g. diphenyl, naphthalene, di- and tri-chlorobenzenes, chloronaphthalene, nitrobenzene, also diphenylene oxide or high boiling alcohols such as diethylene glycol monomethyl or monoethyl ether or benzyl alcohol, or high boiling esters of benzoic or phthalic acid, e.g. benzyl benzoate, phenyl benzoate or dibutyl phthalate.

Examples of acid condensing agents are carboxylic or sulphonic acids, e.g., benzoic acid or xylene sulphonic acid or sulphuric acid and, in particular, carboxylic or sulphonic acid halides such as acetyl, benzoyl, methylbenzyl or chlorobenzoyl chloride or bromide, also methane sulphonic acid halides such as acetyl, benzoyl, methylbenzoyl sulphonic acid chlorides or bromides. Preferred condensing agents are acetyl halides, in particular acetyl chloride as, in contrast to the other acid halides mentioned, in this case no transacylation can take place. To avoid the latter, the other acid halides must be used in limited amounts, about 5 molar percent, per mole of dianil, only.

Depending on the type of dianil used and on any condensing agent present, the temperature maintained during the ring-closing reaction is from about 150 to 250° C.

A modification of the process for the production of dyestuffs of the dioxazine series consists in reacting a compound of Formula III

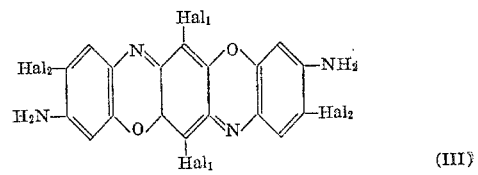

wherein $Hal_1$ and $Hal_2$ have the above given meanings, with an acetylating agent.

As acetylating agent, the anhydride, an ester or a halide of acetic acid is used; acetyl halides, particularly acetyl chloride, are preferred as the best yields are obtained therewith. The acetylation of the bis-primary amino-dioxazine of Formula III to the bis-acetylamino-dioxazine of Formula I is performed by known methods, e.g., in an inert organic solvent alone or in the presence of acid buffering agents and preferably under pressure.

The dioxazine compounds of Formula I according to the invention are obtained in good yields. Generally, they crystallise almost completely even in the hot reaction mixture. They have the characteristic properties of dioxazine dyestuffs, e.g., blue colour of the solution in concentrated sulphuric acid. They are separated by filtration and further purified by washing the residue with organic solvents and aqueous acids or bases.

Further details can be seen from the following non-limitative examples. The temperatures are given therein in degrees centigrade and parts and percentages are by weight unless otherwise stated.

*Example 1*

14.52 g. of 3,6-dichloro-2,5-bis-(2'-phenoxy-5'-chloro-4'-acetylamino-phenylamino)-1,4-benzoquinone in 180 g. of nitrobenzene are refluxed for 5 hours. The suspension is filtered cold and the residue is washed with ethanol and acetone and dried. 10 g. of coarsely crystalline 2,6-di-acetylamino-3,7,9,10-tetrachlorotriphenodioxazine are obtained. To attain a fine distribution, it is ground with 45 g. of anhydrous calcium chloride and 2 g. of a petroleum fraction boiling at 160–220° for 1½ hours in a 1 litre ball mill containing 3,600 kg. of iron balls each of 1.5 cm. diameter. After extraction with water, a pure bordeaux coloured pigment of soft texture and good colour strength is obtained:

The same yield of a similar pigment is obtained if 14.8 g. of 3,6 - dichloro - 2,5 - bis(2'-(2''-methylphenoxy)-5'-chloro-4'-acetylamino-phenylamino) - 1,4 - benzoquinone are used as starting material and the procedure described in the example is followed.

The starting materials used in this example are produced by condensation of 1 mol of chloranil with 2 mols of 2-phenoxy-4-acetylamino-5-chloraniline or 2-(2'-methylphenoxy)-4-acetylamino-5-chloroaniline. These amines are produced by reaction of 2,5-dichloro-4-nitroaniline with potassium phenolate or potassium-2-methyl phenolate, acetylation of the amine and reduction of the nitro group.

*Example 2*

15.26 g. of 3,6-dichloro-2,5-bis-(2'-phenoxy-5'-bromo-4'-acetylamino-phenylamino)-1,4-benzoquinone in 200 g. of trichlorobenzene are heated for 5 hours at 205°. The suspension is filtered cold and the residue is washed with ethanol and acetone and dried. 10.2 g. of coarsely crystalline red-brown 2,6-diacetylamino-3,7-dibromo-9,10-dichlorotriphenodioxazine are obtained.

The 1,4-benzoquinone derivative used as starting material is produced by condensation of 1 mol of chloroanil with 2 mols of 2-phenoxy-4-acetylamino-4-bromoaniline. This amine is produced by reaction of 2,5-dibromo-4-nitroaniline with potassium phenolate, then acetylation and reduction of the 2-bromo-4-nitro-5-phenoxyaniline.

*Example 3*

15.26 g. of 3,6-dibromo-2,5-bis-(2'-phenoxy-5'-chloro-4'-acetylamino-phenylamino)-1,4-benzoquinone in 350 g. of 1-chloronaphthalene are heated for 30 minutes at 200–210°. The suspension is filtered at 100°, the residue is washed with ethanol and acetone and dried. 8.1 g. of 2,6-diacetylamino-3,7 - dichloro - 9,10 - dibromotriphenodioxazine are obtained as violet-green crystals. After grinding this product in the presence of sodium chloride under the conditions described in Example 1, a pure bordeaux coloured pigment of good colour strength is obtained.

The 1,4-benzoquinone derivative used as starting material is produced by condensation of 1 mol of bromoanil with 2 mols of 2-phenoxy-4-acetylamino-5-chloroaniline.

*Example 4*

8 g. of 2,6-diamino-3,7,9,10-tetrachlorotriphenodioxazine, 240 g. of o-dichlorobenzene and 44 g. of acetyl chloride are heated for 5 hours at 170–175° in a litre enamel autoclave fitted with a stirrer. The pressure rises to 9 atmospheres excess pressure. After cooling, the reaction mass is diluted with 50 g. of ethanol, filtered and the residue is washed with ethanol and acetone. 8.3 g. of 2,6-diacetylamino-3,7,9,10 - tetrachlorotriphenodioxazine are obtained as red-brown crystals. After grinding with sodium sulfate under the condition set forth in Example 1, a pure bordeaux coloured pigment of good colour strength and soft texture is obtained.

*Example 5*

To produce a colour for graphic purposes, 20 parts of 2,6-diacetylamino - 3,7,9,10-tetrachlorotriphenodioxazine, which have been ground with anhydrous calcium chloride as described in Example 1, are mixed and rubbed on a three roll mill with 360 parts of hydrate of alumina, 600 parts of linseed oil varnish of medium viscosity and 2 parts of cobalt linoleate. Prints of great colour strength as well as of very good light fastness can be obtained with this bordeaux coloured printing paste.

*Example 6*

15 parts of finely distributed 2,6-diacetylamino-3,7-dichloro-9,10-dibromotriphenodioxazine are rubbed in a ball mill with 20 parts of wax-free shellac, 3 parts of dibutyl phthalate, 5 parts of polyvinyl butyral, 5 parts of ethylene glycol monoethyl ether and 52 parts of ethyl alcohol. The suspension formed is applied as flexographic ink to paper and produces intensive bordeaux coloured dyeings which have very good fastness to solvents and light.

*Example 7*

4 parts of 2,6-diacetylamino-3,7-dichloro-9,10-dibromotriphenodioxazine produced and ground as described in Example 3, are ground in a ball mill with 35 parts of a 60% solution of a urea-formaldehyde-resin-modified alkyd resin in a xylene/butanol mixture (volume ratio 1:1), 10 parts of terpentine oil and 5 parts of xylene, for 48 hours. By spraying the resulting coloured lacquer onto aluminium sheets and stoving the sheets for 1 hour at 120°, lacquerings are obtained which possess a beautiful deep maroon shade and very good fastness to light, heat and cross-lacquering.

*Example 8*

15 parts of a collodion cotton having a content of 35% of butanol, 15 parts of a phthalate resin modified with castor oil, 15 parts of a 70% butanolic solution of a urea-formaldehyde lacquer resin, 20 parts of butyl acetate, 10 parts of ethyl Cellosolve, 20 parts of toluene and 15 parts of ethanol are worked up into a lacquer. The latter is then mixed intimately with 2 parts of finely distributed 2,6 - diacetylamino - 3,7 - dichloro - 9,10 - dibromotriphenodioxazine and 2 parts of titanium dioxide (rutile) and the mixture is ground for 24 hours in a ball mill. By spraying and drying this lacquer onto aluminium foil and drying the latter in an air current of 40–50°, a bordeaux coloured coating is obtained which has very good fastness to light and cross-lacquering.

*Example 9*

4 parts of a finely distributed 2,6-diacetylamino-3,7,9,10-tetrachlorotriphenodioxazine produced and ground as described in Example 1 are added to 100 parts of a stoving lacquer consisting of 58.5 parts of a 60% solution of coconut oil-modified alkyd resin in xylene, 23 parts of a 65% solution of a melamine-formaldehyde lacquer in butanol, 17 parts of xylene and 1.5 parts of butanol. The mixture is ground is ground for 48 hours in a ball mill and the lacquer so pigmented is sprayed onto a polished steel surface. After stoving at 120°, a deep maroon coloured dyeing is obtained which has very good fastness to light, cross-lacquering and heat.

*Example 10*

80 parts of unsaturated liquid polyester resin, 19, 72 parts of monostyrene and 0.28 part of cobalt naphthenate siccative having a content of 16% of cobalt, are ground with 1 part of finely distributed 2,6-diacetylamino-3,7,9,10-tetrachlorotriphenodioxazine and 5 parts of titanium dioxide (rutile) in the same manner as described in Example 8. Shortly before this lacquer is used a mixture of 4.15 parts of cumene hydroperoxide (70%), 2.52 parts of ethyl acetate and 13.33 parts of butyl acetate is added. After pouring the mixture onto cardboard and drying in the air, bordeaux coloured coatings having the same good fastness properties as the coating obtained in Example 8.

*Example 11*

24.5 parts of non-esterified epoxide resin, 10.5 parts of an oil-reactive alkylphenol resin, 35 parts of xylene and 30 parts of diacetone alcohol are worked up into a lacquer which is ground with 4 parts of finely distributed 2,6-diacetyl-amino-3,7,9,10 - tetrachlorotriphenodioxazine for 24 hours in a ball mill. After spraying aluminium foil with the mixture and stoving at 120°, bordeaux-coloured coatings are obtained which have similar good fastness properties as the coatings obtained in Example 7.

*Example 12*

100 parts of a pulverulent urea-formaldehyde resin which is suitable for moulding masses are thoroughly ground in a ball mill for 16 hours with 10 parts of lithopone and 1 part of finely distributed 2,6-diacetylamino-3,7,9,10-tetrachlorotriphenodioxazine and then the mass is filled into molds and pressure moulded at 140–

160° C. Bordeaux-coloured molded articles having good fastness to light and heat are obtained.

*Example 13*

67 parts of polyvinyl chloride powder (suspension polymer), 33 parts of dioctyl phthalate, 23 parts of dibutyl tin dilaurate, 7.0 parts of titanium dioxide (anatas) and 0.7 part of finely distributed 2,6-diacetylamino-3,7,9,10-tetrachlorotriphenodioxazine produced and ground as described in Example 1 are mixed and laminated on a 160° hot two-roll mill for 10 minutes until a sheet of 0.4 mm. thickness is obtained. The bordeaux-coloured sheet and its colouring are very fast to light and migration and stable to heat.

*Example 14*

A paste of 50 parts of polyvinyl chloride powder (emulsion polymer), 32 parts of dioctyl phthalate, 1 part of dibutyl tin dilaurate, 6 parts of chalk powder, 10.75 parts of a high boiling benzine fraction for lacquers (140–180° C.) and 2.5 parts of a paste, 40% of which consist of finely ground 2,6-diacetylamino-3,7-dichloro-9,10-dibromotriphenodioxazine and the balance of dioctyl phthalate is applied in a coating apparatus to cotton cloth in a layer of 0.2 mm. thickness. The coated material is then heated for 3 minutes at 160°, a further coating of 0.3 mm. is applied and the material is again heated for 3 minutes at 160°. A bordeaux coloured artificial leather is obtained which has very good fastness to light and migration, and also good fastness to rubbing and washing.

*Example 15*

0.1 part of 2,6-diacetylamino-3,7,9,10-tetrachlorotriphenodioxazine produced and ground as described in Example 1 and 100 parts of polyystyrene granulate are mixed and laminated on a two-roll mill at 130° until the colouring is homogeneous. The mass is then pressed briefly between chromed plates at 150°. The bordeaux-coloured sheets so obtained have very good fastness to light.

Similar results are obtained by performing the pigmenting in a screw type extruder instead of a two-roll mill and then pressing between the aforesaid chrome plates to a thickness of 2 millimeters.

*Example 16*

0.1 part of 2,6-diacetylamino-3,7-dibromo-9,10-dichlorotriphenodioxazine, 0.5 part of titanium dioxide (anatase) and 100 parts of polyethylene granulate are mixed in a drum and the mixture is then laminated on a two-roll mill at 130°. This mass is moulded from an extruder. The articles thus obtained have a beautiful bordeaux shade which is very fast to light.

*Example 17*

0.1 part of 2,6-diacetylamino-3,7-dibromo-9,10-dichlorotriphendioxazine, 0.5 part of titanium dioxide (anatase) and 100 parts of polypropylene granulate are mixed in a drum and the mixture is then worked up on a two-roll mill at 130° as described in Example 15. This mass is pressed while still hot into sheets of 1 millimeter thickness. The articles have a beautiful bordeaux shade which is very fast to light.

*Example 18*

A rubber mixture of 40 parts of Hevea Latex Crepe, 24.5 parts of barium sulphate, 24.8 parts of chalk, 5.22 parts of Lithopone, 4.0 parts of zinc oxide, 0.2 part of paraffin, 0.7 part of sulphur, and 2.0 parts of finely ground 2,6-diacetylamino-3,7,9,10-tetrachloro-triphenodioxazine obtained as described in Example 1 are worked up on a two-roll mill as described in Example 15 and then vulcanized in a press for 10 minutes at 140°. A bordeaux coloured vulcanized rubber sheet is obtained which has good fastness to light. In contact with white or other coloured rubber, the pigment has no tendency to migrate.

*Example 19*

50 parts of 2,6-diacetylamino-3,7,9,10-tetrachlorotriphenodioxazine obtained as described in Example 1, are ground in a ball mill for 72 hours together with 10.5 parts of the sodium salt of the condensation product of naphthalene-2-sulphonic acid and formaldehyde (molar ratio 2:1), 0.5 part of sodium hydroxide and 200 parts of water. 2000 parts of a sodium xanthogenate solution, produced from 180 parts of cellulose, 180 parts of sodium hydroxide, 640 parts of carbon disulphide and 1000 parts of water are added to this paste and the suspension is homogenized by stirring. After leaving the paste stand for 12 hours under reduced pressure to remove air bubbles the viscose is spun in the usual way, desulphurized, washed, brightened and dried in a conventional manner. Bordeaux coloured fibres are obtained which have very good wet fastness and fastness to light.

*Example 20*

25 parts of 2,6-diacetylamino-3,7,9,10-tetrachlorotriphenodioxazine are mixed with 5000 parts of polyhexamethylene adipic acid amide and the mixture is melted in the usual way in an atmosphere of nitrogen at 285°. On spinning the resulting viscous mass, bordeaux coloured fibers are obtained which have good wet fastness and fastness to light.

We claim:

1. A process for the pigmentation of a substrate selected from the group consisting of organic synthetic plastics, lacquers and printing inks, which comprises intimately admixing therewith a finely dispersed compound of the formula.

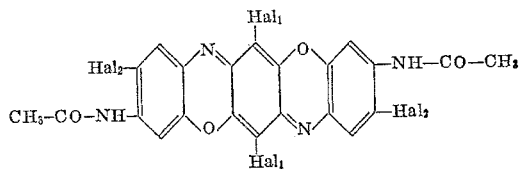

wherein one of the pairs of substituents $Hal_1$ and $Hal_2$ is a pair of chlorine atoms and the other pair is a member selected from the group consisting of a pair of chlorine atoms and a pair of bromine atoms, in an amount of from 0.001 to 30% by weight calculated on the weight of the material being pigmented.

2. A pigmented composition comprising an intimate admixture of a substrate selected from the group consisting of
   (a) polyvinylchloride, polyvinyl acetate, polyacrylonitrile, polymers of lower alkyl esters of acrylic and methacrylic acid, polyethylene, polypropylene, polystyrene, rubber and chlorinated rubber, synthetic polyamide, polyethylene glycol terephthalate, acetylcellulose, viscose, nitrocellulose, shellac, phenol formaldehyde lacquer resin, melamine formaldehyde lacquer resin, urea formaldehyde lacquer resin, unmodified alkyd resins, alkyd resins modified with monostyrene, alkyd resin modified with a fatty acid, alkyd resin modified with a resinic acid, alkyd resin modified with a mixture of a resinic and a fatty acid, alkyd resin modified with urea formaldehyde lacquer resin, oil-modified alkyd resin, polyvinylacetal, unsaturated liquid polyester resin modified with monostyrene, saturated liquid polyester resin, epoxide resin, unsaturated liquid polyester resin, oil-reactive alkyl phenol resin, mixtures of the two latter resins, drying oil capable of forming varnishes, and ketonic resins, and (b) as a pigment, a compound of the formula

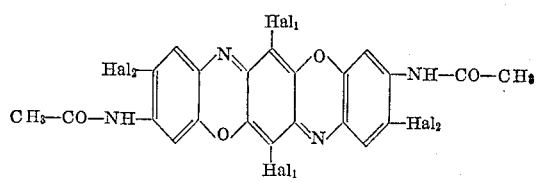

wherein one of the pairs of substituents $Hal_1$ and $Hal_2$ is a pair of chlorine atoms and the other pair is a member selected from the group consisting of a pair of chlorine atoms and a pair of bromine atoms in an amount of from about 0.001 to 30% by weight calculated on the weight of the material being pigmented.

3. A pigmented composition of matter comprising an intimate admixture of polyvinyl chloride with a compound of the formula

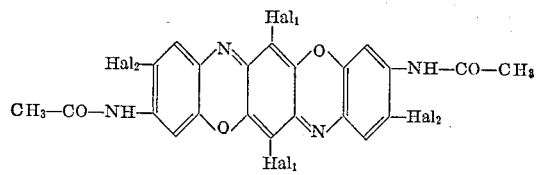

wherein one of the pairs of substituents $Hal_1$ and $Hal_2$ is a pair of chlorine atoms and the other pair is a member selected from the group consisting of a pair of chlorine atoms and a pair of bromine atoms, in an amount of from about 0.001 to 5% by weight calculated on the weight of the material being pigmented.

4. A pigmented composition of matter comprising an intimate adximture of polyethylene with a compound of the formula

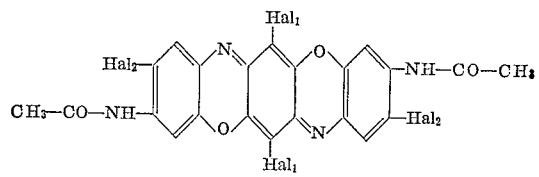

wherein one of the pairs of substituents $Hal_1$ and $Hal_2$ is a pair of chlorine atoms and the other pair is a member selected from the group consisting of a pair of chlorine atoms and a pair of bromine atoms, in an amount of from about 0.001 to 5% by weight calculated on the weight of the material being pigmented.

5. A pigmented composition of matter comprising an intimate admixture of polystyrene with a compound of the formula

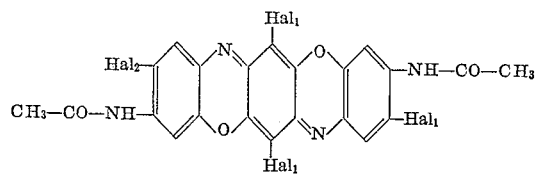

wherein one of the pairs of substituents $Hal_1$ and $Hal_2$ is a pair of chlorine atoms and the other pair is a member selected from the group consisting of a pair of chlorine atoms and a pair of bromine atoms, in an amount of from about 0.001 to 5% by weight calculated on the weight of the material being pigmented.

6. A pigmented composition of matter comprising an intimate admixture of polypropylene with a compound of the formula

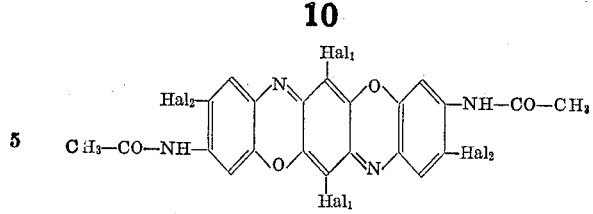

wherein one of the pairs of substituents $Hal_1$ and $Hal_2$ is a pair of chlorine atoms and the other pair is a member selected from the group consisting of a pair of chlorine atoms and a pair of bromine atoms, in an amount of from about 0.001 to 5% by weight calculated on the weight of the material being pigmented.

7. Pigmented lacquer consisting essentially of
(a) nitrocellulose as film-forming ingredient,
(b) organic solvent, and
(c) from 0.001 to 5% by weight, calculated on the weight of (a), of a compound of the formula

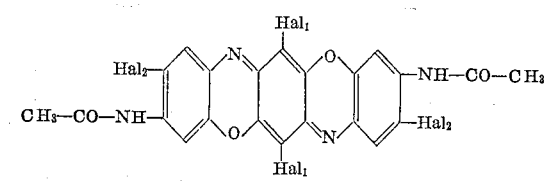

wherein one of the pairs of substituents $Hal_1$ and $Hal_2$ is a pair of chlorine atoms and the other pair is a member selected from the group consisting of a pair of chlorine atoms and a pair of bromine atoms.

8. Pigmented lacquer consisting essentially of
(a) melamine formaldehyde lacquer resin as film-forming ingredient,
(b) organic solvent, and
(c) from 0.001 to 5% by weight, calculated on the weight of (a), of a compound of the formula

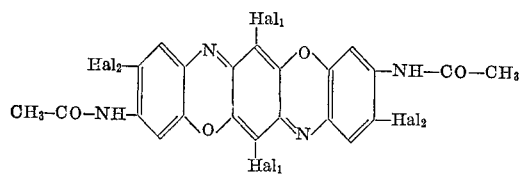

wherein one of the pairs of substituents $Hal_1$ and $Hal_2$ is a pair of chlorine atoms and the other pair is a member selected from the group consisting of a pair of chlorine atoms and a pair of bromine atoms.

9. Pigmented lacquer consisting essentially of
(a) urea formaldehyde lacquer resin as film-forming ingredient,
(b) organic solvent, and
(c) from 0.001 to 5% by weight, calculated on the weight of (a), of a compound of the formula

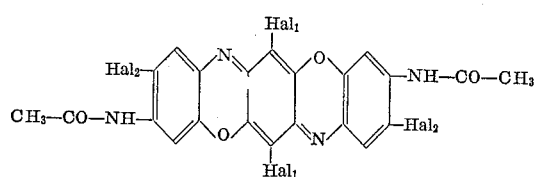

wherein one of the pairs of substituents $Hal_1$ and $Hal_2$ is a pair of chlorine atoms and the other pair is a member selected from the group consisting of a pair of chlorine atoms and a pair of bromine atoms.

10. Pigmented lacquer consisting essentially of
(a) alkyd resin as film-forming ingredient,
(b) organic solvent, and
(c) from 0.001 to 5% by weight, calculated on the weight of (a), of a compound of the formula

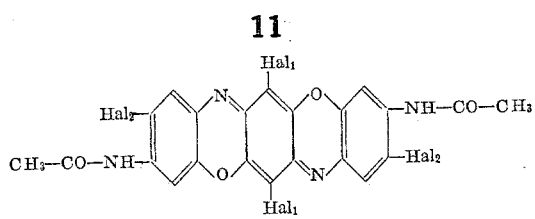

wherein one of the pairs of substituents Hal$_1$ and Hal$_2$ is a pair of chlorine atoms and the other pair is a member selected from the group consisting of a pair of chlorine atoms and a pair of bromine atoms.

11. Pigmented lacquer consisting essentially of
(a) linseed oil as film-forming ingredient, and
(b) from 5 to 30% by weight, calculated on the weight of (a), of a compound of the formula

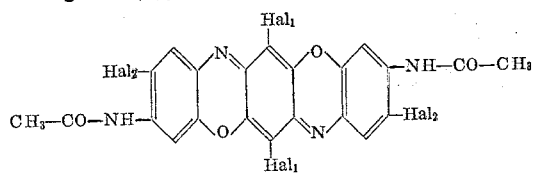

wherein one of the pairs of substituents Hal$_1$ and Hal$_2$ is a pair of chlorine atoms and the other pair is a member selected from the group consisting of a pair of chlorine atoms and a pair of bromine atoms.

12. A process according to claim 1, wherein the said compound is 2,6-diacetylamino-3,7,9,10-tetrachloro-triphenodioxazine.

13. A process according to claim 1, wherein the said compound is 2,6-diacetylamino-3,7-dichloro-9,10-dibromo-triphenodioxazine.

14. A process according to claim 1, wherein the said compound is 2,6-diacetylamino-3,7-dibromo-9,10-dichloro-triphenodioxazine.

15. A composition according to claim 2, wherein said compound is 2,6 - diacetylamino - 3,7,9,10-tetrachloro-triphenodioxazine.

16. A composition according to claim 2, wherein the said compound is 2,6-diacetylamino-3,7-dichloro-9,10-dibromo-triphenodioxazine.

17. A composition according to claim 2, wherein the said compound is 2,6-diacetylamino-3,7-dibromo-9,10-dichloro-triphenodioxazine.

References Cited by the Examiner
UNITED STATES PATENTS 3,022,298  2/1962  Mory et al. _____ 106—193 XR
3,036,071  5/1962  Frey et al. _____ 260—246

ALEXANDER H. BRODMERKEL, *Primary Examiner.*

J. H. WOO, *Assistant Examiner.*